United States Patent [19]
Mizrahi

[11] Patent Number: 5,457,760
[45] Date of Patent: Oct. 10, 1995

[54] WAVELENGTH DIVISION OPTICAL MULTIPLEXING ELEMENTS

[75] Inventor: Victor Mizrahi, Bedminster, N.J.

[73] Assignee: AT&T IPM Corp., Coral Gables, Fla.

[21] Appl. No.: 239,098

[22] Filed: May 6, 1994

[51] Int. Cl.$^6$ .............................. G02B 6/34; G02B 6/28
[52] U.S. Cl. .............................. 385/37; 385/14; 385/15; 385/24; 385/45; 359/115; 359/124; 359/127; 359/130
[58] Field of Search ................................ 385/14, 15, 24, 385/27, 39, 45, 37, 31; 372/6, 96, 102; 359/115, 124, 127, 130

[56] References Cited

U.S. PATENT DOCUMENTS

| | | | |
|---|---|---|---|
| 4,560,249 | 12/1985 | Nishiwaki et al. | 359/3 |
| 4,726,011 | 2/1988 | Ih et al. | 359/127 |
| 4,773,063 | 9/1988 | Hunsperger et al. | 359/130 |
| 4,901,306 | 2/1990 | Gardner | 359/125 |
| 4,923,271 | 5/1990 | Henry et al. | 359/130 |
| 4,926,412 | 5/1990 | Jannson et al. | 359/130 |
| 5,063,559 | 11/1991 | Marcuse | 359/127 |
| 5,064,263 | 11/1991 | Stein | 385/14 |
| 5,093,876 | 3/1992 | Henry et al. | 385/28 |
| 5,107,359 | 4/1993 | Ohuchida | 359/124 |
| 5,195,161 | 3/1993 | Adar et al. | 385/129 |
| 5,206,920 | 4/1993 | Cremer et al. | 385/37 |
| 5,212,577 | 5/1993 | Nakamura et al. | 359/124 |
| 5,226,100 | 7/1993 | Maerz | 385/45 |
| 5,235,659 | 8/1993 | Aktins et al. | 385/124 |
| 5,283,686 | 2/1994 | Huber | 359/337 |
| 5,287,427 | 2/1994 | Atkins et al. | 385/124 |
| 5,351,324 | 9/1994 | Forman | 385/37 |

FOREIGN PATENT DOCUMENTS 5-327664 of 1993 Japan.

OTHER PUBLICATIONS

Hill, K. O. et al., "Narrow–Bandwidth Optical Waveguide Transmission Filters", *Electronics Letters*, vol. 23, No. 9, 23 Apr. 1987, 465–466.

Bilodeau, F., et al., "High–Return–Loss Narrowbond All–Fiber Bandpass Bragg Transmission Filter", *IEEE Photonics Technology Letters*, vol. 6, No. 1, Jan. 1994, pp. 80–82.

Henry, C. H. et al., "Compound Bragg Reflection Filters Made by Spatial Frequency Doubling Lithography", *J. Lightwave Technol.*, vol. 7, No. 9, Sep. 1989, pp. 1379–1385.

Mizrahi, V. et al., "Optical Properties of Photosensitive Fiber Phase Gratings", *J. Lightwave Technol.*, 11, vol., No. 10, Oct. 1993, pp. 1513–1517.

Morey, W. W. et al., "Photoinduced Bragg Gratings in Optical Fibers", *Optics & Photonics News*, OSA 1993 Report, Feb. 1994, pp. 8–14.

Mizrahi, V. et al., "Ultraviolet Laser Fabrication of Ultrastrong Optical Fiber Gratings and of Germania–doped Chan (List continued on next page.)

Primary Examiner—Brian Healy
Attorney, Agent, or Firm—Margaret A. Burke; Glen E. Books

[57] ABSTRACT

The present invention relates to methods and apparatus for wavelength division multiplexing (WDM) using arrays of optical filtering elements to create a desired wavelength passband in an optical filter. In one aspect of the invention, an optical demultiplexer is formed using an input waveguide, such as a planar waveguide or an optical fiber, coupled to plural output waveguides. Each output waveguide includes a wavelength selective configuration of optical filtering elements formed within a contiguous portion of the waveguide forming an optical channel-selective filter having spectral regions having an optical transmission passband and spectral regions of low transmissivity. Exemplary optical filtering elements are Bragg gratings formed into an optical filter which transmits a characteristic wavelength band.

9 Claims, 3 Drawing Sheets

OTHER PUBLICATIONS nel Waveguides", *Appl. Phys. Lett.,* vol. 63, No. 13, Sep. 27, 1993, pp. 1727–1729.

Farries, M. C. et al., "Broadband Chirped Fibre Bragg Filters for Pump Rejection and Recycling in Erbium Doped Fibre Amplifiers", *Elect. Lett.,* vol. 28, No. 5, Feb. 27, 1992, pp. 487–489.

Pan, J. J. et al., "Optoelectronic Components Make WDM Networks Practical", *Laser Focus World,* Jan. 1994, pp. 111–115.

WAVELENGTH DIVISION OPTICAL MULTIPLEXING ELEMENTS

BACKGROUND OF THE INVENTION

1. Field of the Invention

The invention relates to wavelength division optical multiplexing and, more particularly, to wavelength division demultiplexers and multiplexers including arrays of optical filtering elements such as Bragg gratings, that form optical filters having characteristic wavelength passbands.

2. Description of the Related Art

Wavelength-division multiplexing is a valuable technique for increasing the information-carrying capacity of an optical communication network. In a multiplexed network, it is essential to provide wavelength-selective components that can separate a particular wavelength channel from a group of multiplexed channels. Bragg gratings, elements comprising regions of refractive index perturbations which reflect particular wavelengths, are advantageously used to provide spectral selectivity. They are readily made with passbands that match desired channel widths, and they are readily integrated with optical waveguides such as optical fibers, planar, and channel waveguides. Current channel-selective filters using Bragg gratings can suffer from relatively high coupling losses; others are difficult to manufacture because they must be made to extremely close tolerances.

For example, one known filter configuration includes an input fiber coupled to a fiber-based Bragg grating through a directional optical coupler. Light reflected from the grating is coupled to an output waveguide through the same coupler. In this manner, the narrow reflection band of the grating is effectively transformed into a transmission band for the filter as a whole. However, this arrangement suffers 6 dB of coupling loss, to which is added the intrinsic loss in the directional coupler.

Another example is a filter described in K. O. Hill et al., "Narrow-Bandwidth Optical Waveguide Transmission Filters," *Electronics Letters* 23 (1987) pp. 465–466. This filter consists of a loop of single-mode optical fiber which includes a fused-taper directional coupler at the point where the loop branches off from the straight part of the fiber. A Bragg grating is situated symmetrically midway in the fiber loop. This filter can be made to have relatively low loss. However, this filter is difficult to manufacture because exact placement of the Bragg grating is required in order to achieve the desired transmission characteristics. Bilodeau et al., "High-Return-Loss Narrowbond All-Fiber Bandpass Bragg Transmission Filter," *IEEE Photonics Technology Letters*, Vol. 6, No. 1, (1994), pp. 80–82 describes a design modification of the Hill et al. filter.

Compound Bragg reflection filters made in planar waveguides are described in C. H. Henry et al., "Compound Bragg Reelection Filters Made by Spatial Frequency Doubling Lithography," *J. Lightwave Technol.* 7 (1989) pp. 1379–1385. As reported therein, a filter having desirable spectral properties can be made by forming a Bragg grating having many, e.g., 15, sections, each with a different spatial period. To avoid phase shifts near 90° between sections, the sections are made contiguous, resulting in a grating period that is piecewise constant, but discontinuously varied.

Accordingly, there is a need in the art for wavelength division multiplexing elements which are simple to manufacture and which are readily formed from optical filtering elements which separate a particular wavelength channel from a group of multiplexed channels. There is a further need in the art for wavelength division optical multiplexing elements which are insensitive to the polarization of incident radiation.

SUMMARY OF THE INVENTION

The present invention relates to methods and apparatus for wavelength division multiplexing (WDM) using arrays of optical filtering elements to create a desired wavelength passband in an optical filter. In one aspect of the invention, an optical demultiplexer is formed using an input waveguide, such as a planar waveguide or an optical fiber, coupled to plural output waveguides. Each output waveguide includes a wavelength selective configuration of optical filtering elements formed within a contiguous portion of the waveguide. The configuration forms an optical channel-selective filter with spectral regions having an optical transmission passband and spectral regions of low transmissivity.

In one embodiment, the invention relates to an optical demultiplexer having an input waveguide and N output waveguides, N being a whole number greater than or equal to 2. Each output waveguide includes a wavelength-selective configuration of at least (N−1) optical filtering elements such as Bragg gratings, each of the Bragg gratings having at least one wavelength band of low transmissivity, $\lambda_x$ where each x is a number from 1 to N. The configuration of optical filtering elements creates an optical filter which transmits a characteristic wavelength band, i.e., the wavelength band $\lambda_n$ of the Bragg grating absent from the configuration of optical filtering elements in the waveguide. A connecting element such as a 1×N coupler is positioned between the input and output waveguides to divide optical transmissions from the input waveguide among the output waveguides.

In another aspect, the present invention provides an optical demultiplexer having an input waveguide and N output waveguides. Y branching waveguides are positioned between the input waveguide and the output waveguides, Y being a whole number greater than or equal to 2 and less than or equal to N−1. As in the previous embodiment, each of the output waveguides transmits a characteristic wavelength band, $\lambda_n$, where n is a whole number from 1 to N. Positioned within the output waveguides and said branching waveguides are a plurality of optical filtering elements each optical filtering element having a different wavelength band of low transmissivity $\lambda_x$, where x is a whole number from 1 to N and is not equal to n, the number corresponding to the channel passband. The plurality of optical filtering elements is configured such that within the optical path of the transmission emitted from each output waveguide are positioned at least N−1 optical filtering elements, each of the N−1 optical filtering elements having a different wavelength band of low transmissivity. Thus, the combination of the optical filtering elements is such that the combination of the low transmissivity wavelength bands of each of the N−1 optical filtering elements results in transmission of the characteristic wavelength, $\lambda_n$. In an exemplary embodiment, the branching waveguide includes all of the optical filtering elements for the wavelength bands which are not to be transmitted by any of the output waveguides connected to that branching waveguide.

In another aspect, the present invention relates to polarization-insensitive wavelength division alemultiplexers. The demultiplexer includes an input optical waveguide and plural output waveguides. Each output waveguide has a plurality of optical filtering elements integrally formed within a contiguous portion of the waveguide. The demultiplexers exhibit a polarization sensitivity of about 1 part in 100,000 or less.

DETAILED DESCRIPTION

Figure 1:
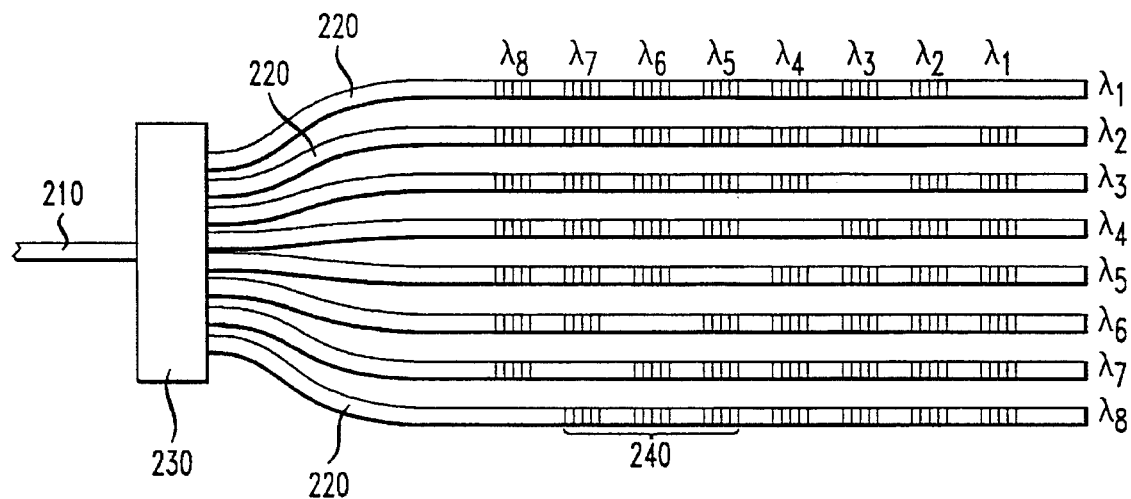
FIG. 1 is a schematic representation of an 8-channel optical demultiplexer according to one embodiment of the present invention.

The invention will now be described with reference to the drawings in detail, in which like reference numerals indicate the same or similar elements in each of the FIGS. While the invention is described in terms of its application to demultiplexing, it will be appreciated by those skilled in the art that the invention applies equally well to multiplexing. A demultiplexing apparatus, operated in the opposite order, i.e., specific wavelength bands added to the transmitted radiation rather than filtered out of a composite transmission, functions as a multiplexing apparatus. The term "demultiplexer" or "demultiplexing" as used herein encompasses any device used to separate a particular wavelength band from a group of multiplexed wavelength bands. This additionally includes devices used to route wavelength bands positioned well before the receivers in a transmission system.

In one embodiment, of the present invention, the demultiplexer includes an input optical waveguide and a plurality of output optical waveguides, each output optical waveguide having an optical filter comprising an array of optical filtering elements, such as Bragg diffraction gratings, formed in a contiguous portion of the output waveguide.

Bragg gratings are regions of refractive index perturbations within a waveguiding element which create a reflection peak from wavelengths of incident radiation satisfying the Bragg condition:

$$\lambda_{Bragg} = 2n_{eff}\Lambda = 2n_{eff}\frac{\lambda_{uv}}{2\sin\alpha}$$

where $\lambda_{Bragg}$=wavelengths of incident radiation which satisfy the Bragg condition $n_{eff}$=effective refractive index of the waveguiding medium $\lambda_{uv}$=wavelength of the uv radiation used to form the grating $\alpha$=half angle of incidence of the exposing radiation $\Lambda$=spacing of the refractive index perturbations (grating period)

The optical filter formed from the array of optical filtering elements, such as an array of Bragg gratings, transmits a characteristic wavelength band by reflecting the collective wavelength bands reflected by each individual Bragg grating. The term reflection, as used herein, includes any radiation which is not transmitted by the waveguide, i.e., it includes radiation which is scattered out of the waveguide.

As schematically illustrated in FIG. 1, demultiplexer 220 includes an input waveguide 210 and N output waveguides 220 coupled to waveguide 210 through 1×N coupler 230. For the demultiplexer shown in FIG. 1, N=8; however N is any whole number greater than or equal to 2. Each output waveguide transmits a characteristic wavelength band, $\lambda_n$, where n is a whole number between 1 and N. For the FIG. 1 demultiplexer, n=8. The wavelength indices which appear at the terminus of each waveguide denote which desired signal wavelength band is passed by that output waveguide. It will be appreciated by those skilled in the art that radiation outside the signal wavelength bands may also be passed to the output waveguides; such radiation does not deleteriously impact system performance.

Positioned within each of the output waveguides are N–1 optical filtering elements 240. For the illustrated demultiplexer, N=8, therefore there are 8–1=7 optical filtering elements. Exemplary optical filtering elements 240 are Bragg gratings, each Bragg grating having a wavelength band of low transmissivity, i.e., the wavelength band which the grating attenuates. The combination of the optical filtering elements forms an optical filter in which all of the wavelength bands are blocked except the characteristic wavelength band of the output waveguide. Thus, for the output waveguide labeled $\lambda_1$, the seven Bragg gratings positioned within that waveguide collectively attenuate wavelength bands $\lambda_2$, $\lambda_3$, $\lambda_4$, $\lambda_5$, $\lambda_6$, $\lambda_7$, and $\lambda_8$, as illustrated in FIG. 1. The wavelength numbers which appear adjacent each grating in the output waveguides indicate the wavelength band blocked by that grating.

Optionally, an additional Bragg grating is positioned in the array. The additional Bragg grating does not correspond to a channel, but instead is used to broaden the channel of the Bragg grating with the shortest wavelength. A further Bragg grating can also be used to broaden the channel of the Bragg grating with the longest wavelength. The use of an additional Bragg grating on the short and/or long wavelength end of the spectrum permits attenuation of additional undesirable wavelengths, such as those which might result from amplified spontaneous emission noise in an optical amplifier.

Each of the remaining output waveguides includes a similar array of filters, i.e., for the 8-channel demultiplexer of FIG. 1, there are seven Bragg gratings in each output waveguide, each Bragg grating blocking a different wavelength band between $\lambda_1$ and $\lambda_8$. Using $\lambda_x$ to represent the characteristic wavelength band of the output waveguide, the seven Bragg gratings block wavelengths from n=1 to n=8. There is no Bragg grating blocking a wavelength for $\lambda_n$ where n=x, i.e., no Bragg grating is positioned in the output waveguide which blocks the wavelength band to be passed by that output waveguide.

Although the demultiplexer of FIG. 1 employs a Bragg grating for each channel to be blocked, a single Bragg grating can be used to block two or more channels simultaneously when the reflection peak of the grating is sufficiently wide. For this embodiment, the demultiplexer has N channels but fewer than (N–1) optical filtering elements positioned within each output waveguide.

Figure 2:
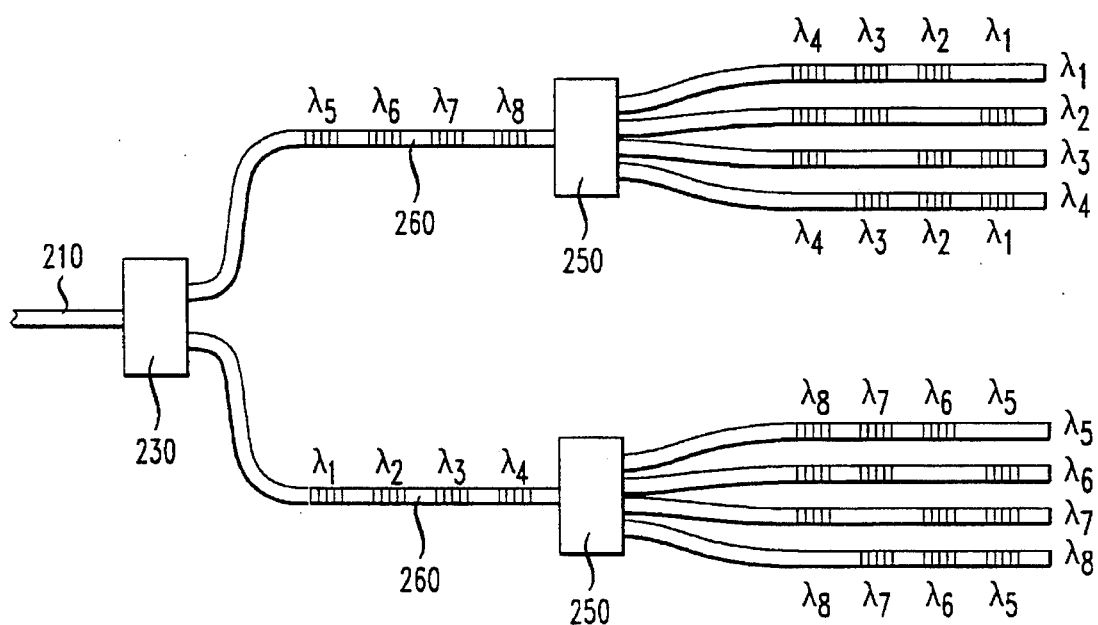
FIG. 2 is a schematic representation of an 8-channel optical demultiplexer according to a further embodiment of the present invention.

FIG. 2 illustrates a further embodiment of a demultiplexer according to the present invention. In the demultiplexer of FIG. 2, branching waveguides 260 are positioned between the input waveguide 210 and N output waveguides 220.

These branching waveguides have optical filtering elements 270, such as Bragg gratings, formed therein. Advantageously, the optical filtering elements formed within the branching waveguides eliminate the need to repeat the branching waveguide filtering elements within the output waveguides. Thus, the wavelength bands which are to be blocked by all output waveguide within a set of output waveguides have the corresponding optical filtering elements formed within the branching waveguide, eliminating the need to duplicate filtering element formation within each of the output waveguides.

The input waveguide 210 is connected to the branching waveguides 260 through 1×Y coupler 230, as in the previous embodiment, where Y is the number of branching waveguides which connect to the input waveguide. In general, Y is a whole number greater than or equal to 2 and less than or equal to N−1. In the demultiplexer of FIG. 2, N is equal to eight and Y is equal to two. A coupler 250 is positioned between branching waveguides 260 and output waveguides 220. In FIG. 2, 1×4 couplers are used to connect the branching and output waveguides.

For the demultiplexer configuration of FIG. 2, the output waveguides passing wavelength bands $\lambda_1$–$\lambda_4$ all must block wavelength bands $\lambda_5$–$\lambda_8$. Therefore, the branching waveguide which transmits radiation into these four output waveguides includes filtering elements which block the transmission of wavelength bands $\lambda_5$–$\lambda_8$. As compared to the demultiplexer configuration of FIG. 1, twenty-four fewer optical filtering elements are included in the output waveguides due to the addition of the branching waveguides having filtering elements blocking wavelength bands common to the connecting output waveguides.

Figure 3:
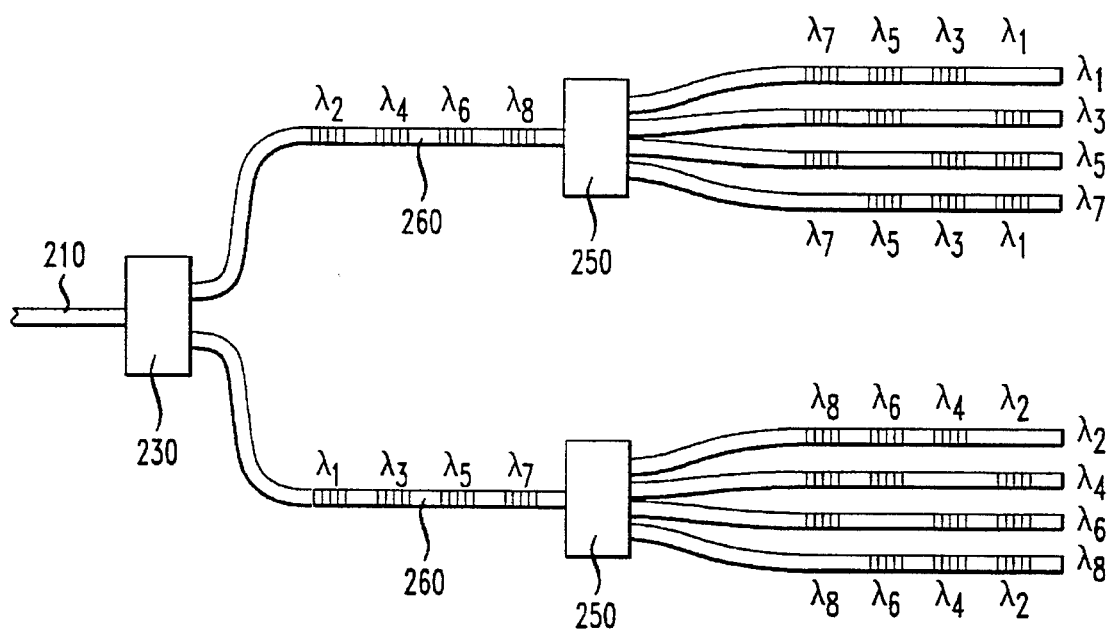
FIG. 3 is a schematic representation of an 8-channel demultiplexer according to a further embodiment of the present invention.

An exemplary optical filtering element array for the branching configuration depicted in FIG. 2 is illustrated in FIG. 3. In this embodiment, the selection of optical filtering elements is staggered such that the array of optical filtering elements in the output waveguides does not include optical filtering elements which block wavelength bands adjacent to the pass wavelength band of the output waveguide. The wavelength passband for the four output waveguides which connect to the first branching waveguide are selected to be $\lambda_1$, $\lambda_3$, $\lambda_5$, and $\lambda_7$. Thus, none of the output waveguides connected to the first branching waveguide will transmit wavelength bands $\lambda_2$, $\lambda_4$, $\lambda_6$, and $\lambda_8$. For this reason, filtering elements which block the transmission of $\lambda_2$, $\lambda_4$, $\lambda_6$, and $\lambda_8$ are positioned within the first branching waveguide. The remaining wavelength bands to be blocked in order to transmit the desired wavelength band are positioned in the output waveguide. For the output waveguide which transmits wavelength band $\lambda_1$, the remaining wavelength bands to be blocked are $\lambda_3$, $\lambda_5$, and $\lambda_7$. Filtering elements such as Bragg gratings which block these wavelength bands are positioned within the output waveguide as shown in FIG. 3. This configuration of filtering elements advantageously permits relaxed tolerances on grating positioning in the output waveguides since twice the channel spacing is produced in the output waveguides through the blocking of alternate wavelength bands by the gratings positioned in the branching waveguides.

Figure 4:
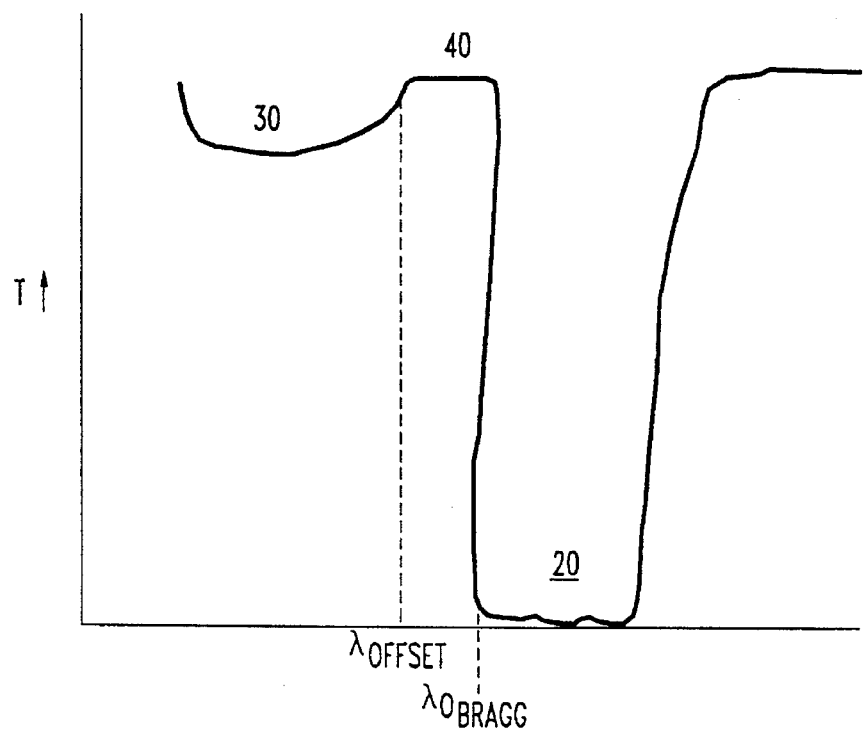
FIG. 4 is a transmission spectrum of a Bragg grating used as an optical filtering element according to the invention in one embodiment.

An idealized transmission spectrum for a single Bragg grating is depicted in FIG. 4. In spectrum 10, region 20 is a wavelength band having a transmission minimum which corresponds to incident radiation reflected or scattered by the grating. On the short wavelength side of transmission minimum 20 is dip 30. Dip 30 results from radiation loss and is separated from transmission minimum 20 by relatively high transmissivity region 40. The expression "radiation loss" describes any light which is scattered out of the core of the waveguide, including radiation scattered in the cladding of the waveguide.

The short-wavelength edge of transmission minimum 20 is $\lambda_{Bragg}$, i.e., the Bragg wavelength in the limit of a very weak grating. In this limit, the long-wavelength edge of the dip occurs at the wavelength $\lambda_{Bragg} - \lambda_{offset}$ where $\lambda_{offset}$ is given by:

$$\lambda_{offset} = \frac{\lambda_{oBragg}}{2}\left(1 - \frac{n_{cl}}{n_{eff}}\right)$$

where $n_{cl}$=cladding refractive index $n_{eff}$=effective refractive index of the waveguide medium It is usually advantageous to reduce the depth of region 30, minimizing radiation loss. However, as grating strength increases, measured by the widening of transmission minimum region 20, radiation loss increases. On a log transmission plot, radiation loss increases quadratically for a given increase in grating strength, whereas widening of region 20 increases only linearly for strong gratings. Radiation loss can interfere with transmission when it occupies a spectral region for a channel passband.

Several techniques are used to eliminate or reduce the impact of radiation loss on an optical filter formed from plural Bragg gratings. One technique minimizes radiation loss through the use of waveguiding media having large effective refractive indices. Alternatively, gratings may be formed in waveguiding media having weak radiation loss and fused to transmission waveguiding media. Peak radiation loss can further be reduced by recoating the grating region of the waveguide to improve transmission characteristics. See, for example, Mizrahi and Sipe, *J. of Light Tech.*, Vol. 11 (October 1993) pp. 1513–1517, especially FIGS. 3(a) and 4, the disclosure of which is incorporated herein by reference.

The design of the optical filter also minimizes or reduces the effects of radiation loss. For filters having a small number of channels, the grating configuration positions channel passbands in spectral regions where there is no radiation loss region from other gratings in the filter.

For filters having larger numbers of channels, it is often not possible to avoid a passband for a particular channel falling within a spectral region of radiation loss for another grating. In such situations, plural weaker gratings can be used to pass a single channel since weaker gratings exhibit proportionally less radiation mode loss, as discussed above. Weaker gratings are formed by controlling the amount of actinic radiation exposure, and hydrogenation level and germanium doping levels in hydrogen-treated germanosilicate waveguides.

The waveguides employed in the alemultiplexers of FIGS. 1–3 are exemplarily single-mode optical fibers, as are typically employed in optical transmission systems, while the 1×N coupler is exemplarily a fused fiber coupler. However, waveguides for the above alemultiplexers are selected from any waveguiding media which transmit optical signals including, but not limited to, multiple-mode fiber and planar waveguides. Additionally, fibers and planar waveguides can be incorporated into a single device, e.g., input and/or output fibers coupled to a planar waveguide in which Bragg gratings are formed.

Various coupler combinations can provide the desired 1×N coupling. For example, the configuration illustrated in FIG. 2 employs one 1×2 coupler and two 1×4 couplers to create an array with 1 input waveguide and 8 output waveguides. Numerous other combinations can be used to achieve similar results.

Radiation losses may be minimized by using a section of multiple-mode fiber having a small number of modes since multiple-mode fiber generally has better mode-field confinement for the fundamental mode than single-mode fiber. By carefully injecting radiation from a single-mode fiber into a multiple-mode fiber at a wavelength near cutoff, it is possible to largely avoid exciting any but the fundamental mode of the multiple-mode fiber. A section of multiple mode fiber can be inserted through fusion splicing of multiple-mode and single-mode fibers.

When using Bragg diffraction gratings as optical filtering elements, a preferred method for grating formation is to optically induce refractive index perturbations. A photosensitive optical waveguide, such as an optical fiber, is exposed to an interference pattern of actinic, typically ultraviolet, radiation to form refractive index perturbations at least partially in the fiber core. Alternatively, the waveguide is exposed to an interference pattern created by impinging a single actinic beam on a phase mask. The phase mask is a patterned, diffractive medium that modulates the relative phase of the diffracted wavefronts. Phase masks are typically manufactured by reactive ion etching of a fused-quartz substrate through a chromium mask patterned by electron-beam lithography. However, various other methods may be used to form phase masks, such as holographic patterning techniques. The use of phase masks to fabricate Bragg gratings is described in allowed U.S. patent application Ser. No. 08/004,770, filed Jan. 14, 1993, by D. Z. Anderson et al., the disclosure of which is incorporated by reference herein.

To produce strong gratings, i.e., those gratings having wide spectral reflection peaks, waveguides are sensitized by exposure to hydrogen gas prior to patterning with actinic radiation. This technique is described in U.S. Pat. No. 5,235,659 issued on Aug. 10, 1993 by R. M. Arkins et al. and U.S. Pat. No. 5,287,427 issued on Feb. 15, 1994 by R. M. Arkins et al., the disclosures of which are incorporated by reference herein. Grating strength is controlled through actinic radiation exposure for a given photosensitive medium. When using hydrogen-treated germanosilicate glass waveguides, the hydrogenation levels in the waveguide core also controls grating strength. Further description of Bragg grating fabrication to form optical filters is found in U.S. patent application Ser. No. 08/078,992 filed Jun. 17, 1993 to Mizrahi and assigned to the present assignee, the disclosure of which is incorporated herein by reference.

Figure 5:
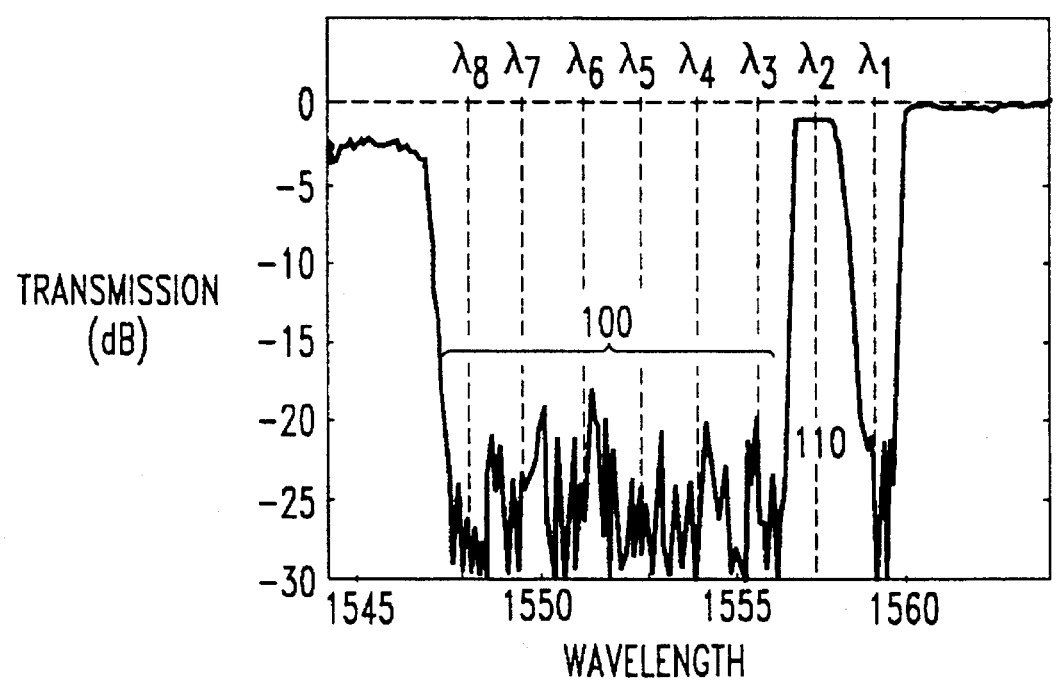
FIG. 5 is a transmission spectrum for one channel of the demultiplexer of FIG. 1.

FIG. 5 is a transmission spectrum, i.e., transmission as a function of wavelength, for the channel corresponding to $\lambda_2$ of the 8-channel demultiplexer of FIG. 1. In this FIG., region 100 represents the transmission minimum resulting from gratings which block wavelength bands $\lambda_1, \lambda_3, \lambda_4, \lambda_5, \lambda_6, \lambda_7$, and $\lambda_8$. Note that the noise which appears in region 100 is instrumentation-induced and not representative of the attenuation characteristics of the demultiplexer. Channel 2 ($\lambda_2$), shown as region 110, is passed by this output waveguide of the demultiplexer. The approximate locations of the wavelengths corresponding to each channel are indicated by the dashed lines in FIG. 5.

Advantageously, alemultiplexers formed according to the present invention are insensitive to the polarization of the light which passes through them. By polarization insensitivity, it is meant that the transmission spectrum of the demultiplexer does not shift for radiation of different polarizations. Thus, a device having a polarization sensitivity of 1 pan in 100,000 exhibits a worst-case shift of 0.15 Å or less at a wavelength of 15,000 Å. Since optical fibers often do not maintain polarization over long distances, polarization insensitivity of the demultiplexers results in effective signal filtering regardless of the polarization of the incident radiation. In particular, the demultiplexers of the present invention can be formed with a polarization sensitivity of less than 1 part in 100,000.

Demultiplexers formed according to the present invention are suitable for incorporation in terrestrial and underseas optical communication systems. Such optical communications systems generally include an optical source such as a laser, a modulating member to create a desired optical signal, a transmission member such as a fiber or planar waveguide, conventional or optical amplifiers, e.g., erbium-doped fiber amplifiers (EDFAs), and receivers. Advantageously, the use of wavelength division demultiplexers increases the capacity of a single-mode optical fiber transmission system by permitting a single fiber to carry plurality wavelength bands. Such systems typically incorporate optical isolators in the optical amplifiers to prevent transmission of light reflected by the optical filters back down the transmission member. When incorporated in a terrestrial or underseas communication system, it is advantageous to package the demultiplexer to assure thermal stability of the device. Heating and/or cooling elements permit a desired temperature range to be selected, ensuring the accuracy and reliability of the demultiplexer.

The demultiplexers of the present invention can also be employed in optical systems other than the above-named optical telecommunications systems. Such optical systems include, but are not limited to, local area network (LAN) and CATV systems.

While the invention has been described with respect to the foregoing embodiments, it will be appreciated that various changes and modifications may be made. Accordingly, changes and modifications such as those suggested above, but not limited thereto, are within the scope of the claimed invention.

I claim:

1. An optical demultiplexer comprising:

an input optical waveguide;

N output optical waveguides, N being a whole number greater than or equal to 2, each output waveguide including a wavelength-selective configuration of optical filtering elements comprising at least (N−1) Bragg gratings, each of said Bragg gratings having at least one wavelength band of low transmissivity, $\lambda_x$ where x is a number between 1 and N, said configuration of optical filtering elements forming an optical filter transmitting a characteristic wavelength band, the characteristic wavelength band being the wavelength band $\lambda_n$ of the Bragg grating absent from the configuration of optical filtering elements in the waveguide; and an element positioned between said input waveguide and said output waveguides for splitting optical transmissions from the input waveguide to the output waveguides.

2. An optical demultiplexer according to claim 1 wherein said waveguides are optical fibers having cladding and core layers.

3. An optical demultiplexer according to claim 2 where the Bragg gratings are at least partially formed in the waveguide core.

4. An optical demultiplexer comprising:

an input optical waveguide;

N output optical waveguides, where N is a whole number greater than or equal to 3, each of said output waveguides transmitting a characteristic wavelength band, $\lambda_n$, where n is a whole number from 1 to N;

Y branching waveguides positioned between said input waveguide and said output waveguides where Y is a whole number greater than or equal to 2 and less than or equal to N–1;

positioned within said output waveguides and said branching waveguides are a plurality of optical filtering elements, each optical filtering element having a wavelength band of low transmissivity $\lambda_x$, where x is a whole number from 1 to N and is not equal to n, said plurality of optical filtering elements configured such that within the optical path of the transmission emitted from each output waveguide are positioned at least N–1 optical filtering elements, each of the at least N–1 optical filtering elements having a different wavelength band of low transmissivity, the combination of the optical filtering elements being such that the combination of the low transmissivity wavelength bands of each of the at least N–1 optical filtering elements results in the transmission of the characteristic wavelength, $\lambda_n$;

an element for splitting optical transmission from the input waveguide to the branching waveguides positioned between the input waveguide and the branching waveguides; and elements positioned between the branching waveguides and the output waveguides for splitting optical transmission from the branching waveguides among the output waveguides.

5. An optical demultiplexer according to claim 4 wherein N=8 and Y=2.

6. An optical demultiplexer according to claim 4 wherein the waveguides are optical fibers having cladding and core layers.

7. An optical demultiplexer according to claim 6 wherein the optical filtering elements are Bragg gratings at least partially formed in the waveguide core.

8. An optical communications system comprising:

an optical source;

a modulator for modulating light from said optical source to create a modulated optical signal having a plurality of wavelength bands;

a transmission member for transmitting said optical signal; and an optical demultiplexer for separating wavelength bands from said optical signal, said optical demultiplexer comprising:
an input optical waveguide;
N output optical waveguides, N being a whole number greater than or equal to 2, each output waveguide including a wavelength-selective configuration of optical filtering elements comprising at least (N–1) Bragg gratings, each of said Bragg gratings having at least one wavelength band of low transmissivity, $\lambda_x$ where x is a number between 1 and N, said configuration of optical filtering elements forming an optical filter transmitting a characteristic wavelength band, the characteristic wavelength band being the wavelength band $\lambda_n$ of the Bragg grating absent from the configuration of optical filtering elements in the waveguide; and
an element positioned between said input waveguide and said output waveguides for splitting optical transmissions from the input waveguide to the output waveguides.

9. An optical communications system comprising:

an optical source;

a modulator for modulating light from said optical source to create a modulated optical signal having a plurality of wavelength bands;

a transmission member for transmitting said optical signal; and an optical demultiplexer for separating wavelength bands from said optical signal, said optical demultiplexer comprising:
an input optical waveguide;
N output optical waveguides, where N is a whole number greater than or equal to 3, each of said output waveguides transmitting a characteristic wavelength band, $\lambda_n$ where n is a whole number from 1 and N;
Y branching waveguides positioned between said input waveguide and said output waveguides where Y is a whole number greater than or equal to 2 and less than or equal to N–1;
positioned within said output waveguides and said branching waveguides are a plurality of optical filtering elements, each optical filtering element having a wavelength band of low transmissivity $\lambda_x$, where x is a whole number from 1 to N and is not equal to n, said plurality of optical filtering elements configured such that within the optical path of the transmission emitted from each output waveguide are positioned at least N–1 optical filtering elements, each of the at least N–1 optical filtering elements having a different wavelength band of low transmissivity, the combination of the optical filtering elements being such that the combination of the low transmissivity wavelength bands of each of the at least N–1 optical filtering elements results in the transmission of the characteristic wavelength, $\lambda_n$;
an element for splitting optical transmission from the input waveguide to the branching waveguides positioned between the input waveguide and the branching waveguides; and
elements positioned between the branching waveguides and the output waveguides for splitting optical transmission from the branching waveguides among the output waveguides.

* * * * *